United States Patent [19]
Harmand et al.

[11] Patent Number: 5,418,025
[45] Date of Patent: May 23, 1995

[54] WINDOW GLASS WITH AN ELECTROCONDUCTIVE LAYER, OBTAINED BY PYROLYSIS OF POWDERED COMPONENTS, WHICH CAN BE USED AS A WINDSHIELD FOR AN AUTOMOBILE

[75] Inventors: Helene Harmand, Paris; Vincent Sauvinet, Ermenonville; Maurice Trouve, Nemours, all of France

[73] Assignee: Saint Gobain Vitrage, Courbevoie, France

[21] Appl. No.: 239,929

[22] Filed: May 9, 1994

Related U.S. Application Data

[63] Continuation of Ser. No. 811,907, Dec. 23, 1991, abandoned, which is a continuation of Ser. No. 383,523, Jul. 24, 1989, abandoned.

[30] Foreign Application Priority Data

Jul. 27, 1988 [FR] France .................... 88 10138

[51] Int. Cl.⁶ .................... B32B 17/10
[52] U.S. Cl. .................... 428/38; 219/203; 219/522; 219/543; 428/76; 428/195; 428/210; 428/336; 428/423.1; 428/425.6; 428/426; 428/432; 428/437; 428/442; 428/460; 428/216; 428/697; 428/699; 428/701; 428/702; 428/913
[58] Field of Search ............. 428/38, 76, 195, 210, 428/336, 423.1, 425.6, 426, 432, 437, 460, 442, 216, 697, 699, 701, 702, 913, 472; 219/203, 522, 543

[56] References Cited

U.S. PATENT DOCUMENTS

| | | | |
|---|---|---|---|
| 2,648,254 | 8/1953 | Lytle | 428/433 |
| 3,974,359 | 8/1976 | Orcutt et al. | 219/541 |
| 4,057,671 | 11/1977 | Shoop | 428/433 |
| 4,073,986 | 2/1978 | Keslar et al. | 219/522 |
| 4,409,227 | 12/1984 | Bitter | 428/432 |
| 4,583,815 | 4/1986 | Taga et al. | 350/1.6 |
| 4,584,229 | 4/1986 | Bourelier et al. | 428/216 |
| 4,644,139 | 2/1987 | Harrison et al. | 219/522 |
| 4,652,494 | 3/1987 | Bravet et al. | 428/423.1 |
| 4,654,067 | 3/1987 | Ramus et al. | 65/60.51 |
| 4,655,811 | 4/1987 | Bitter | 427/107 |
| 4,859,499 | 8/1989 | Sauvinet et al. | 427/108 |

FOREIGN PATENT DOCUMENTS

| | | |
|---|---|---|
| 0108616 | 5/1984 | European Pat. Off. . |
| 0274914 | 7/1988 | European Pat. Off. . |

*Primary Examiner*—Archene Turner
*Attorney, Agent, or Firm*—Oblon, Spivak, McClelland, Maier & Neustadt

[57] ABSTRACT

A window glass comprising at least one sheet of glass coated with an electroconductive ITO layer, pyrolyzed from powdered components, combined with a flexible plastic material of the PVB, PU, PVC type, with an index approaching more the index of the ITO layer than the index of air, with which the said layer is coated, and a sheet of glass dyed in the mass, with the same color as the ITO layer, and with properties of reduced energy transmission also entering advantageously into the composition of the window glass is provided. The invention particularly applies to the production of heated windshields for automobiles.

33 Claims, 2 Drawing Sheets

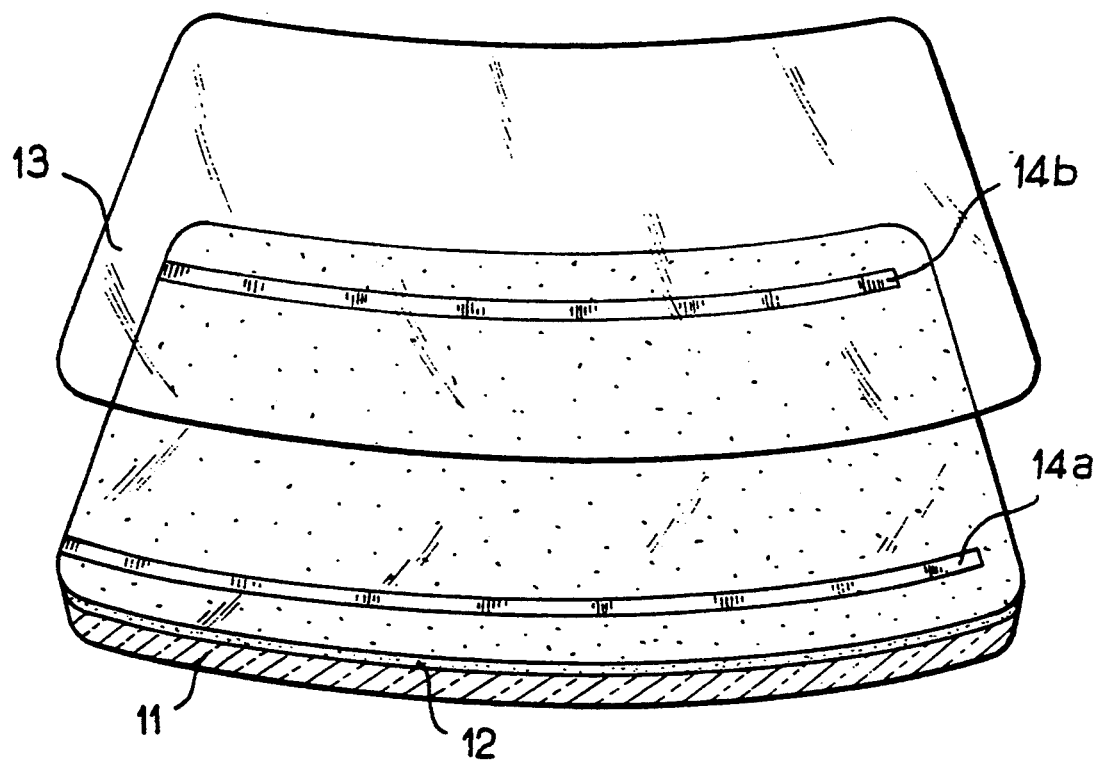
FIG_1
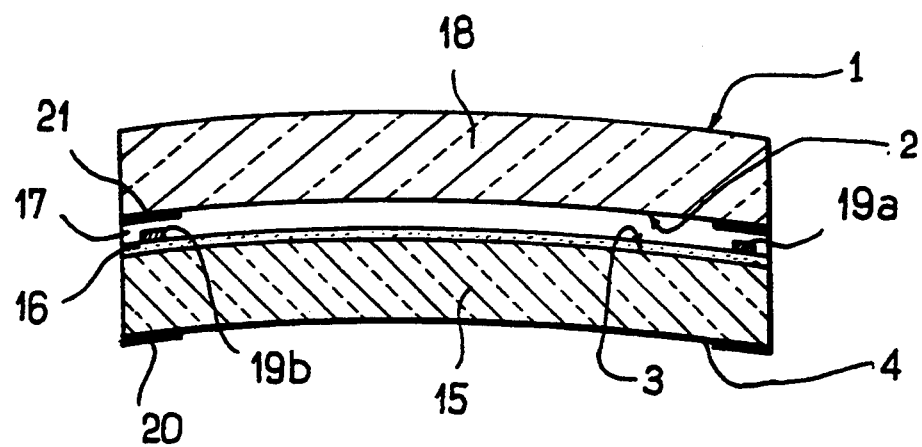
FIG_2

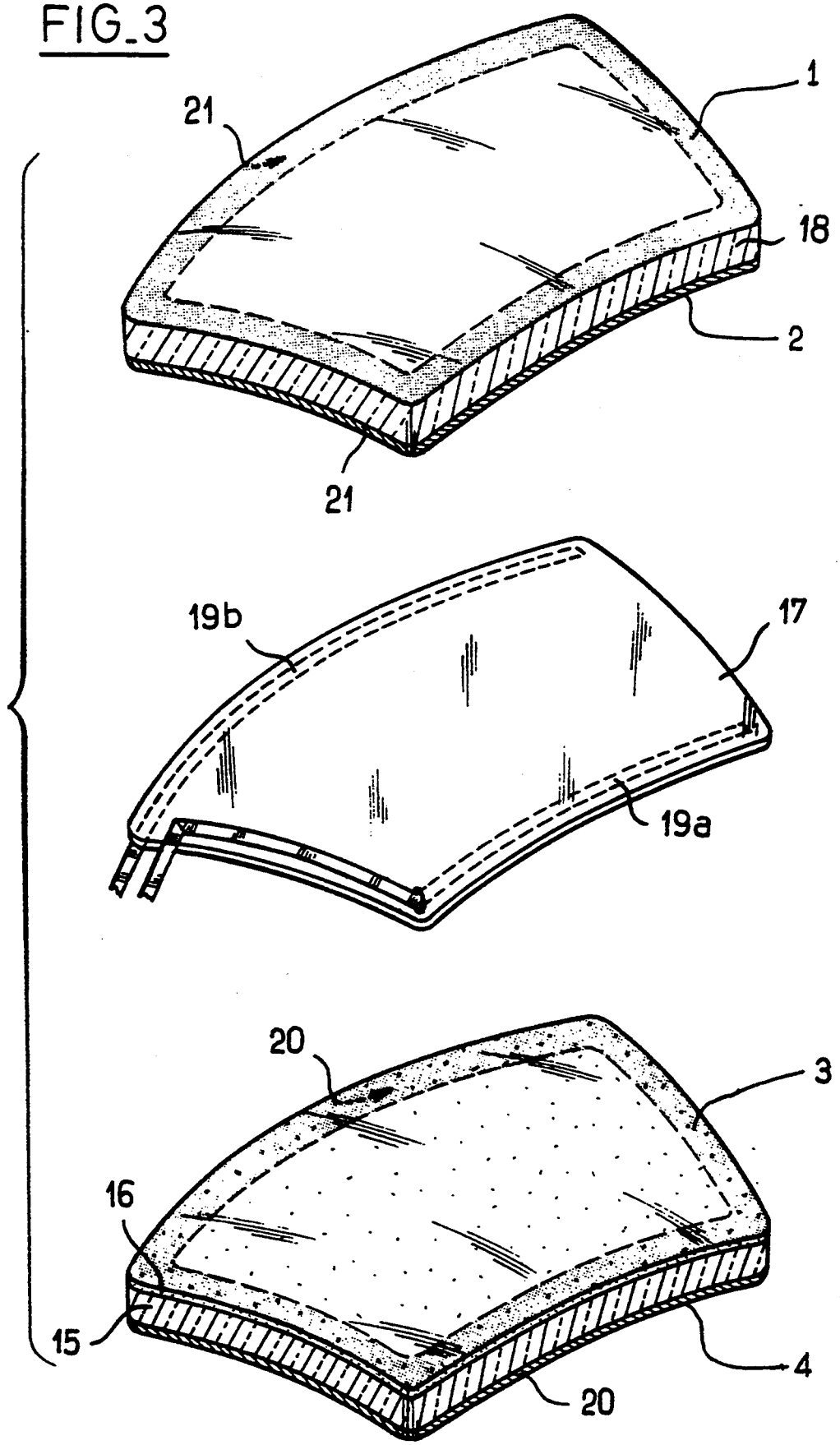

WINDOW GLASS WITH AN ELECTROCONDUCTIVE LAYER, OBTAINED BY PYROLYSIS OF POWDERED COMPONENTS, WHICH CAN BE USED AS A WINDSHIELD FOR AN AUTOMOBILE

This application is a continuation of application Ser. No. 07/811,907, filed on Dec. 23, 1991, now abandoned, which is a continuation of Ser. No. 07/383,523, filed Jul. 24, 1989, (now abandoned).

BACKGROUND OF THE INVENTION

1. Field of the Invention

The present invention concerns window glass equipped with an electroconductive coating based on metal oxides obtained by pyrolysis of powdered components, particularly for use as a windshield for automobiles.

In particular, the invention concerns such a coating which presents sufficiently low electrical resistance, while still allowing good transmission of light in the visible range, so that it can be used as heated window glass in an automobile.

2. Discussion of the Background Art

It is known from various prior patents that window glass can be manufactured, coated with conductive layers having light transmission properties greater than 75% or 70%, which, depending on legislation, which allows its use as window glass for automobiles, and having a resistance per square on the order of 10 ohms and even as low as 5 ohms.

Thus, the patent document EP-A-192 009 proposes window glass coated with a pyrolized ITO (indium tin oxide) layer obtained from powdered components, with a thickness of 1900 and 300 Angstroms, presenting a resistance per square which is 11 and 7.5 ohms, respectively, and a factor of light transmission of 83 and 82%, respectively.

The layer with a thickness of 300 Angstroms is red-mauve in reflection, which has little chance of acceptance on the esthetic level, due to lack of harmony with the colors of car bodies.

Furthermore, these pyrolized layers present a slight speckling and a slight haze, which are not at all a problem for window glass used in buildings, but can be objected to for automobile window glass. Thus, the standards for automobile windshields require that the haze (percentage of diffused light) not be greater than 0.5%, which is less than what the eye can perceive with normal vision (2 to 3%) and than what is accepted for windows intended for buildings.

It should be noted that this prior patent EP 192 009 proposes production of window glass laminated with an ITO layer, but to facilitate the thermal reduction treatment of the ITO, it provides that the said thermal reduction treatment is carried out on the finished laminated window glass, with a burner, this burner having the advantage of heating the ITO layer rapidly to treat it, without having time to heat the structure of the window glass, the ITO layer being arranged on the exterior of the window glass for this purpose, directly in contact with the flame of the burner.

The patent document U.S. Pat. No. 4,490,227 proposes window glass coated with an ITO layer obtained by vacuum techniques, with a thickness on the order of 2800 Angstroms, transmission on the order of 78%, resistance per square approximately 7 to 10 ohms.

These layers under vacuum take long to produce and are expensive, and obtaining lower resistances increases the production time and the cost, on the one hand, and causes the risk of exceeding the limits of 75 or 70% transmission required for automobile window glass, on the other hand.

Patent document U.S. Pat. No. 4 655 811 discloses ITO layers deposited under vacuum with resistances per square down to 5 ohms with light transmission compatible with applications in automobiles. Production costs are high, production time is long, and increasing the thickness would increase those costs and production times even more, while reducing light transmission too low.

Also known is window glass coated with a stack of layers obtained by vacuum techniques, layers among which there is a layer of Ag surrounded by dielectric layers. This type of window glass has an electrical resistance greater than 5 ohms, similar to the preceding types already mentioned, and also these layers easily oxidize and degrade, particularly due to humidity. Furthermore, the sheets of glass coated with these stacks of layers containing an Ag layer require great precautions during lamination to produce laminated window glass, because the least spot of dirt, the least bit of dust, creates a visible defect.

SUMMARY OF THE INVENTION

The present invention aims at providing window glass coated with a layer of electroconductive ITO, which can be used as window glass for automobiles, and for vehicles in general, which can be heated electrically by means of electrical energy available on the vehicle, the ITO layer of which is resistant, esthetically pleasing (neutral color or identical color as that of anti-sun window glass for automobiles which is currently used and accepted, without speckling, without haze, etc.) and the production costs of which are lower than those of window glass produced in a vacuum.

This use of window glass in automobiles implies a high transmission of light for the illuminant A, (TL), which according to regulations must be at least 75% or 70%, depending on legislation.

It preferably aims at a window glass coated with an electroconductive ITO layer having an electrical resistance per square equal to or advantageously less than 5 ohms.

Furthermore, it also preferably aims at window glass which increases the comfort of the vehicle passengers, and is therefore capable of providing lower energy transmission relative to conventional window glass, in spite of the high transmission of light required by regulations.

For this, the invention comprises a window glass having at least one sheet of glass coated with an ITO layer, obtained by pyrolysis of a powdered tin compound, particularly DBTO (dibutyl tin oxide), and an indium compound, particularly indium formiate, then by reduction treatment of the layer obtained in this way, combined with a sheet of flexible plastic material of the PVB, PU, PVC type, with an index approaching more the index of the ITO layer than the index of air.

This sheet is of a material belonging to the following group:
PVB (polyvinyl butyral)
PVC (polyvinyl chloride)
PU (polyurethane), and possesses an optical index between the index 1 of air and the index on the order of 1.8 of the ITO layer, particularly an index on the order of 1.5.

Due to the arrangement of the ITO layer on one face of the sheet of glass, which allows it to be placed in contact with a flexible material which is able to attach intimately to any irregularities of the surface of the ITO layer, due to the higher index of this material, speckling is practically suppressed, and furthermore, the possible hazy appearance of the ITO layer is non-existent and compatible with the regulations.

Advantageously, the ITO layer has a thickness such that its color is a color accepted for automobile window glass, in particular a color which is slightly green in reflection.

According to a first embodiment, the ITO layer has a thickness at least less than 330 nanometers, which gives it a resistance per square equal to or less than 5 ohms, and preferably a thickness on the order of 350–380 nanometers, which gives it a resistance per square on the order of 4.5 ohms–4.0 ohms.

According to another embodiment, the ITO layer has a thickness on the order of 180 nanometers, which gives it a resistance per square on the order of 10 ohms.

Advantageously, to give the window glass the properties of improved energy transmission aiming at increasing comfort, and also to contribute to improving the appearance of the said window glass, the sheet of glass which carries the ITO coating and/or another sheet of glass which is combined with it to comprise a laminated window glass with it is a glass tinted in the mass, of the type called "TSA" or "TSA$^{2+}$".

The invention also proposes a process for the production of window glass with an electroconductive ITO layer such as presented above.

BRIEF DESCRIPTION OF THE DRAWINGS

The invention will now be described in more detail, with reference to the attached figures, which represent:

FIG. 1: a first variation of the window glass according to the invention, in an exploded view, FIG. 2: a laminated window glass having an ITO layer according to the invention, FIG. 3: a laminated window glass according to the invention, having received its enamel deposits and leads for electrical current with the aim of being installed as a windshield for an automobile.

DETAILED DESCRIPTION OF THE INVENTION

FIG. 1 shows a window glass comprised of a single sheet of glass 11 coated with a layer 12 of ITO, and combined with a sheet 13 of a flexible material with an index of refraction greater than that of air, between the index of air and the index of the ITO layer (1.8) and particularly on the order of 1.5, able to adhere perfectly to the layer 12, and to attach intimately to any irregularities, also able to be used as such, in other words without protection or covering.

Such a sheet 13, based on polyurethane (PU), is described in detail in the patent documents published in EUROPE under the numbers 54 491, 132 198, 133 090 and the patent document published in FRANCE under the number 2 398 606. According to these patents, the PU sheet is a two-layer sheet comprising a layer of thermoplastic PU which absorbs energy, and a layer of thermo-hardening PU which is self-sealing and prevents laceration.

The sheet 11 is made of silicon-sodium-calcium glass conventionally used for window glass in automobiles and buildings. This can be a clear, i.e. non-colored glass, which has a high transmission of light, greater than 90% at a thickness of 4 mm. It can also be a glass dyed in the mass, which is able to provide increased comfort for the passengers of the vehicle or the premises equipped with such glass, because of its reduced factor of energy transmission.

Advantageously, the coloring of the glass is the same as that of the layer 12, namely green for layer thickness on the order of 350–380 nm, or 180 nm.

Thus, by the simple fact of the coloring of the glass, any slight irregularities in the color of the layer are masked. Furthermore, the color green is well accepted for automobile window glass.

Furthermore, these types of glass which are tinted in the mass by ferrous oxides possess properties of absorbing IR radiation, and therefore interesting energy properties in general, thanks to which the comfort is increased.

Thus, as colored glass, the glass type called "TSA" which contains $Fe_2O_3$ in weight proportions on the order of 0.55 to 0.62%, FeO at approximately 0.11 to 0.16%, resulting in a ratio of $Fe^{2+}/Fe$ on the order of 0.19 to 0.25, CoO at less than 12 ppm and preferably even less than 10 ppm, can be used.

This results in the following properties, for example, for a thickness of 3.85 mm: high light transmission ($T_L$) in the range of 78%, a relatively low factor of energy transmission ($T_E$) in the range of 60, resulting in a ratio of $T_L/T_E$ on the order of 1.30.

As colored glass, particularly when the regulations only require a light transmission of 70%, a more highly colored glass than "TSA" which demonstrates slightly lower light transmission, can also be used, namely "TSA$^{2+}$".

This "TSA$^{2+}$" is colored with the same oxides as above, but the proportions are slightly different.

Thus, the proportions of metal oxides are the following:

$Fe_2O_3$ : approximately between 0.75 and 0.90%

FeO: approximately between 0.15 and 0.22%

CoO: less than 17 ppm and preferably even less than 10 ppm resulting in $Fe^{2+}/Fe$=approximately 0.20.

This results in the following properties for a "TSA$^{2+}$" glass at a thickness of 3.85 mm:

$T_L$: on the order of 72%

$T_E$: on the order of 50% which results in a ratio of $T_L/T_E$ on the order of 1.40 or 1.50.

Thus, an automobile window glass according to the invention can be produced with a sheet of glass 11 made of "TSA" glass with a thickness of 3 mm, covered with an ITO layer with a thickness on the order of 350–380 nm, or, with even more reason, on the order of 180 nm, itself covered with polyurethane as described in the prior patents already cited. With the thickness of the layer 12 of 180 nm, the thickness of the "TSA" glass can be slightly greater, and can reach 3.5 or 4 mm.

This results in window glass with a slightly green color in transmission, green in reflection, having a $T_L$ compatible with the automobile regulations (greater than 75%) and a $T_L/T_E$ on the order of 1.40.

If one wishes to use "TSA$^{2+}$" in place of "TSA", with the former having light transmission coefficients compatible with the regulations, a sheet of glass 11 can be chosen that is made of "TSA$^{2+}$" and has a thickness of 3 mm, preferably with a layer thickness of 180 nm.

This then results in a $T_L$ coefficient for the finished window glass which is greater than 70%, a $T_L/T_E$ coefficient on the order of 1.50, in other words reduced energy transmission and therefore improved comfort.

It is understood that the window glass according to the invention with glass thicknesses for the sheet 11 which are less than those indicated above are possible, with all the more reason since that makes it possible to increase the light transmission and consequently, the regulations are met.

FIG. 2 shows a laminated window glass with at least two thicknesses of glass, comprised of a first sheet of glass 15 coated with a layer 16 of ITO, combined with a sheet 17 of a material with an index of refraction greater than that of air, between the index of air and the index of the ITO layer (1.8) and particularly on the order of 1.5, able to adhere perfectly to the layer 16, also able to comprise the intermediate plastic layer of a laminated window glass, also comprised of a second sheet of glass 18. If desired, additional sheets of glass and intermediate plastic layers can be added to form a thicker, stronger laminate.

The sheet 17 is, for example, made of PVB (polyvinyl butyral) conventionally used to produce laminated window glass, or of PVC (polyvinyl chloride) or PU (polyurethane).

The sheet of glass 18 and/or possibly the sheet of glass 15 is advantageously made of a glass dyed in the mass, with improved energy properties, as stated previously, "TSA" or "TSA$^{2+}$" glass.

The layers 12 and 16 of ITO in the embodiments shown in FIGS. 1 and 2 are obtained by pyrolysis of a mixture of powders of an indium compound as the essential component, particularly indium formiate (InFo) and a tin compound, particularly dibutyl tin oxide (DBTO). In the case of InFo and DBTO, the weight proportions are on the order of 90% InFo and 10% DBTO; then grain size is between 5 and 20 microns and preferably between 5 and 15 microns.

Such a mixture of InFo and DBTO is described in the European patent document 192 009.

The distribution of the powder mixture on the glass substrate is carried out using the installations already described in detail in the European patent documents published under the numbers 125 513, 130 919, 191 258, 189 709, 188 962.

The projected quantity of the mixture is such that the layer 12 or 16 formed has a thickness of either at least 330 nanometers and, for example, on the order of 350–380 nanometers, or on the order of 180 nanometers. Once the layer of ITO 12 or 16 has been deposited, the sheet of glass 11 or 15 carrying the said layer is curved, if necessary, in addition to and preferably at the same time with the other sheet of glass 18, if it is being used, to be combined with the sheet 15 in the case where a laminated window glass with two sheets of glass is being produced. Advantageously, this sheet 11 or 15, as well as possibly the other sheet of glass 18 used to form a laminated window glass, are slightly tempered at their edges to make the said edges more solid and therefore to make handling, installation in windows or car body openings, etc., less problematic and to reduce breakage.

This layer 12 or 16 deposited on the sheet of glass 11 or 15, possibly curved, is then reduced by specific treatment, for example thermal treatment in a controlled reduction atmosphere or thermal treatment by a burner with a reduction flame.

Thus it is known that thermal treatment in a controlled reduction atmosphere can be carried out at a temperature on the order of 400° C. for a period of approximately 30 minutes, in a reduction atmosphere containing, for example, $N_2+10\%$ $H_2$. Different times, temperatures, hydrogen percentages can be used, knowing, however, that if the time is reduced, the temperature and/or hydrogen percentage should be increased, and vice versa. However, this temperature on the order of 400° C., at which relaxation of the constraints in the glass is slow, has the advantage of preserving the slight tempering of the edges of the glass sheets to a great extent.

The reduction treatment can be carried out independent of the curving treatment, or, if desired, simultaneously. In the latter case, the sheet of glass 11 or 15 coated with its layer 12 or 16 to be reduced, and possibly also the second sheet of glass 18 which is to be combined with the sheet 15 to comprise a laminated window glass, is (are) arranged on a rack or frame for curving and placed in an oven heated to a temperature on the order of 600° or 650° C., under a controlled reduction atmosphere. It (they) take(s) on the shape of the frame as it (they) heat(s), and simultaneously, the layer 2 or 6 [sic] is reduced.

According to the invention, to the extent that a laminated window glass is being produced, the layer 12 or 16 of ITO is deposited on one face of the sheet of glass 11 or 15 which is to come into contact with the intermediate plastic layer, for example made of PVB. When there are two layers of glass 15 and 18 placed in the oven to be curved, the layer 16 of ITO is deposited on one of the sheets of glass 15 and arranged between the said two sheets of glass 15 and 18. In spite of the fact that the layer 16 is enclosed between the two sheets 15 and 18, its reduction functions as well as if it were not covered and were in free contact with the treatment atmosphere.

It is well understood that in the case where curving and reduction are carried out simultaneously, the temperature in the oven is higher, which allows a shorter period of thermal reduction treatment; and/or a reduced proportion of hydrogen.

Advantageously, to assure great homogeneity of the reduction treatment, whether this is an operation independent of curving or simultaneous with curving, slight excess pressure is maintained in the reduction oven (which might also be the curving oven), less than 1 bar, on the order of 0.1 to 0.5 bar, for example 0.2 bar.

If slight tempering, for example at the edges of the sheet(s) is desired, blowing is carried out at the end of curving (which might, in certain cases, be simultaneous with the reduction operation).

The sheet 13 or 17 of PVB, PVC or PU material can also be advantageously colored, particularly in a color identical to that of the ITO layer, which makes any small irregularities of color in the ITO layer disappear. These techniques of coloring PVB, PU, PVC are well known and will not be discussed in detail here.

However, it must be noted that if the ITO layer pyrolized according to the invention presents remarkable properties of light transmission for a given electrical resistance, which allows combining the said layer with sheets of glass or of colored PVB, PU, PVC while meeting the requirements with regard to light transmission, it is preferable to choose a colored glass over a colored PVB, since the colored glass by its intrinsic properties results in thermal comfort which colored PVB, PU or PVC do not yield.

To be able to provide electricity to the layer 12 or 16, current lead strips must be put into place.

These strips can be serigraphed conductive strips based on Ag, as usual. Taking into account the solidity of the ITO layer, its thickness, its good adhesion to the glass, it is advantageous to use metallic ribbons or tinsel glued to the conductive layer of ITO, instead of the conventional serigraphed conductive strips, which are held in place by the sheet of plastic material of the PVB, PU or PVC type adhering to the layer.

The metallic tinsel can be made of tin-plated copper, in the form of a ribbon with a width of 8 mm, and a thickness on the order of 80 $\mu$m; these current leads have a resistance per meter of length on the order of 0.02B ohm, therefore very clearly lower than the resistance of conventional current leads deposited by serigraphy.

In the embodiment according to FIG. 1, these serigraphed conductive strips, or in the form of metallic tinsel (tin-plated copper) are referenced as 14a and 14b.

In the embodiment according to FIG. 2, they are referenced as 19a and 19b.

For the purpose of decoration, to hide the conductive strips as well as the glue used to fix these windows in their openings, peripheral deposits of enamel are also provided.

A window glass of the type as that in FIG. 2 is shown in a more detailed exploded view, with all its equipment (conductive strips, enamel deposits) in FIG. 3. In this FIG. 3, the same elements as in FIG. 2 are found again, with the same references, specifically: the sheet of glass 15, carrying the layer 16 of ITO, a second sheet of glass 18 not having any layer, but possibly a glass dyed in the mass, of the "TSA" or "TSA$^{2+}$" type, the sheet 17 of PVB type material, with an index greater than air and possibly colored, the conductive strips 19a and 19b, particularly in the form of tinsel, arranged essentially horizontal and essentially parallel, one at the top part of the window glass, the other at the bottom.

Also shown in FIG. 3 are the peripheral deposits of dark, opaque enamel, for example black, the purpose of which is essentially to improve the esthetic appearance of the window glass placed in an opening by gluing. This enamel particularly serves to hide the current lead strips 19a and 19b, and the glue which serves to fix the windshield in place. These enamel deposits also protect the glue which fixes the windshield in place against the harmful effects of the sun. To perform these various functions, at least two deposits of enamel are necessary: one on the face 4 of the laminated window glass, in other words the face turned towards the interior of the sheet of glass 15 which is the most towards the interior of the area enclosed by the window glass, the other on the face 2 of the laminated window glass, in other words the face of the outside sheet of glass 18 facing towards the interior of the enclosed area. (Conventionally, the faces of a laminated window glass installed in an opening and enclosing a space, for example a car interior, are numbered from the exterior of the enclosed space towards the interior: 1 for the face turned towards the outside of the exterior sheet of glass, 2 for the interior face of this same sheet, in contact with the intermediate plastic layer, 3 for the face directed towards the interior of the window glass, in contact with the intermediate plastic layer, of the innermost sheet of glass, 4 for the interior face towards the enclosed space, of the sheet of glass arranged innermost).

Advantageously, when such a deposit of enamel is made on a face of the sheet of glass destined to come into contact with another sheet of glass during the ulterior phase of curving, the said enamel deposit is fired before anything is placed on it which would bring it into contact with another glass, to prevent it from spotting this other glass. This is particularly practical for the enamel edge deposited on face 2.

AS shown in FIG. 3, the layer 16 of ITO is deposited on face 3. This layer 16 is deposited, for example, at the exit from the float bath of a production installation for plate glass, on a band of plate glass produced continuously. This band is cut into rectangles, then according to the shape of the windshield or window glass, in general, to be produced; this then comprises the sheet 15 coated with its layer 16. This sheet 15 then receives a deposit 20 of enamel on its face not coated with ITO, in other words the face which constitutes face 4 of the laminated window glass, on its periphery, by means of conventional serigraphy techniques. Then this sheet 15 coated with ITO on one side, with its peripheral enamel deposit on the other, is combined with another sheet of glass, sheet 18, also cut, for example, from the band leaving a float line, of clear glass or glass dyed in the mass. This flat sheet 18 receives a peripheral deposit of enamel 21 on one of its faces, the one which constitutes face 2 of the laminated window glass. Advantageously, this deposit 21 on face 2 is fired.

The two sheets of glass 15 and 18 are paired together, i.e. superimposed, face 2 against face 3, and curved simultaneously by being heated and, for example, collapsing onto a frame or rack for curving.

The sheet 15 alone, or the two sheets superimposed at the end of curving, is (are) then subjected to reduction treatment to achieve the properties of the ITO layer 16. In windshields with the conventional curved shape, the layer 16 is on a convex face, it is therefore stretched slightly by the curving of the glass, without any particular precautions, and in spite of this, its properties, particularly the electrical properties, are not affected.

The intermediate layer 17 of a material with an index in the range of that of the ITO layer, in particular of PVB, is cut, combined with the tinsel 19a and 19b, particularly by spot-soldering the said tinsel to the top and bottom edges of the sheet. Advantageously, at one end of the top strip 19a, the metallic tinsel is not cut, but passes to the other side of the PVB by way of an incision made in the PVB, then descends vertically along the edge of the PVB all the way to the level of the lower string of tinsel 19b. The two strings of tinsel 19a and 19b, insulated from one another, are combined so that they can exit at a single point.

This sheet of PVB material is then placed between the two sheet of glass 15 and 18, the strings 19a and 19b of the tinsel being glued to the layer 16 on the face 3.

The window glass unit obtained in this way is laminated by conventional lamination techniques, by pressing, vacuum action and heat. Since this lamination technique is conventional, it is not discussed further here. Let us only point out that pressures on the order of 10 bars, temperatures on the order of 130° C. can be used for this purpose, during times on the order of 1 hour.

The ends of the strings 19a and 19b exiting from the window glass thus produced are available to be connected to the power source of the vehicle on which the window glass is installed.

Possibly, these strings 19a and 19b can be cut and connected to a specific coupling, which facilitates connection to the power source.

As already stated, the sheet of glass 18 can be a glass called "TSA" to improve the energy qualities of the window glass.

Thus the sheet 18 can be a "TSA" glass with a thickness of 2.1 or 2.2 mm, the sheet 17 coated with ITO can be a conventional clear glass with a thickness of 2.1 to 2.6 mm, and the sheet 17 can be a PVB with a thickness of 0.76 mm. This results in a window glass with a slightly greenish appearance, of a perfectly uniform color with a coefficient $T_L$ on the order of 77%, thus in accordance with all the regulations concerning automobile window glass, and a coefficient $T_E$ on the order of 50%, which yields a ratio of $T_L/T_E$ on the order of 1.5.

In another embodiment, the sheet 18 has a thickness of 2.6 mm, all other things remaining equal, and the coefficient $T_L$ drops slightly below 75% for a thickness of the ITO layer on the order of 350-380 nm, but satisfies the regulations of the countries where only a TL of 70% is required. On the other hand, for a thickness of the ITO layer on the order of 180 nm, the threshold of 75% is fulfilled.

To the extent that the power lead strips 19a and 19b are not metallic tinsel, but serigraphed strips, the said serigraphed strips are deposited on the top and bottom edges of the sheet of glass 15 coated with its ITO layer on this ITO layer, thus on the face 3 of the laminated window glass, after being cut to the finished dimensions of the window glass and after peripheral enameling on face 4 of the same sheet 15.

Advantageously, before being combined with the other sheet of glass 18 for curving, these serigraphed strips on the sheet 15 are fired.

To the extent that the window glass produced is of the type shown in FIG. 1, in other words a single sheet of glass 11 coated with ITO in combination with a sheet of material with an index greater than that of air and also as close as possible to that of the ITO, for example of PU, the conductive strips 14a and 14b are also either serigraphed or in the form of tinsel. They are thus in contact with the ITO layer.

To the extent that serigraphed conductive strips are involved, these can be hidden on the outside by a deposit of opaque enamel not shown on the figure, preferably continuous around the entire periphery of the window glass, then reduced in dotted lines from the side to the center of the window glass, the conductive strip of serigraphed Ag being advantageously deposited at the edge of the enamel, riding on the dots of the said enamel and on the ITO layer alone.

Advantageously for the window glass of the type as that shown in FIG. 1, the metallic tinsel or the serigraphed strips are hidden by a frame of thermoplastic material installed on location by the technique called encapsulation. This encapsulation frame can also serve as a cover, as protection and as insulation for the string of metallic tinsel proceeding to the exit of the window glass at the other side of the PU sheet, in other words not in contact with the ITO layer.

It is well understood that such encapsulation is particularly interesting in the case of a window glass according to FIG. 1, but it can also be used for another window glass, for example as shown in FIGS. 2 and 3.

Thus, the good properties of the ITO layer allow it to be combined with types of glass tinted in the mass. This results in window glass with interesting electrical, optical and thermal properties.

Thicknesses of the sheets of glass have been proposed above, which allow the regulations to be met, but also lesser thicknesses than those proposed are acceptable for good reason, since their coefficient $T_L$ will not be too high.

The strength of this layer permits bending of its support after deposit, without any particular precaution even if after curving, the said layer is arranged on the convex face of its support.

This window glass can be used as a heated windshield for automobiles.

Obviously, numerous modifications and variations of the present invention are possible in light of the above teachings. It is therefore to be understood that within the scope of the appended claims, the invention may be practiced otherwise than as specifically described herein.

What is claimed as new and desired to be secured by Letters Patent of the United States is:

1. A curved window glass comprising at least one curved sheet of glass coated with an electroconductive layer of metal oxide comprised of indium tin oxide (ITO), obtained by pyrolysis, followed by reduction treatment, of a powdered mixture of a tin compound and an indium compound, on face 3 of the faces of said curved window glass numbered conventionally 1, 2, 3 and 4 proceeding from the outside to the inside of the space enclosed by the window glass, said (ITO) layer covered by a sheet of flexible plastic material having an optical index between that of the metal oxide layer and that of air and closer to that of the metal oxide layer than to the index of air.

2. The window glass of claim 1, wherein said tin compound comprises dibutyl tin oxide (DBTO).

3. The window glass of claim 1, wherein the plastic sheet is comprised of a material selected from the group consisting of polyvinylbutyral, polyvinylchloride and polyurethane and possesses an optical index between the index 1 of air and the index on the order of 1.8 of the metal oxide layer.

4. The window glass of claim 3, wherein said optical index is about 1.5.

5. A window glass according to claim 1, comprising a single sheet of glass carrying the layer of ITO and wherein the sheet of plastic material is formed, in the order starting from the metal oxide layer, of a layer of thermoplastic polyurethane (PU)

6. A window glass according to claim 1, wherein the flexible plastic material with an index greater than that of air is colored.

7. A window glass according to claim 1, wherein the ITO layer has a thickness which gives it a greenish color.

8. A window glass according to claim 7, wherein the ITO layer has a thickness at least 330 nm.

9. The window glass of claim 8, wherein said ITO layer has a thickness of 350-380 nm.

10. The window glass of claim 7, wherein said ITO layer has a thickness of about 180 nm.

11. A window glass according to claim 1, wherein it comprises a thickness of glass tinted in its body, with a reduced coefficient of energy transmission.

12. A window glass according to claim 11, wherein the tinted glass is either green or the same color as the ITO layer.

13. A window glass according to claim 12, wherein the tinted glass is "TSA" or "TSA$^{2+}$" glass, containing oxide dyes in approximately the following weight proportions:

"TSA" Fe$_2$O$_3$: between 0.55 and 0.62%
FeO: between 0.11 and 0.16%
CoO: less than 10 ppm
"TSA$^{2+}$" Fe$_2$O$_3$: between 0.75 and 0.90%
FeO: between 0.15 and 0.22%
CoO: less than 17 ppm 14. A window glass according to claim 11, wherein the tinted glass is the one which carries the ITO layer.

15. A window glass according to claim 14, comprising a single layer selected from the group consisting of TSA and TSA$^{2+}$ glass with a maximum thickness of 3.5–4 mm, carrying an ITO layer with a thickness of 180 nm, and a sheet of PU coated onto the sheet of glass on the side of the ITO layer.

16. A window glass according to claim 14, comprising a single layer selected from the group consisting of "TSA" or "TSA$^{2+}$" glass with a maximum thickness of 3.5–4 mm, carrying an ITO layer with a thickness of 350–380 nm, and a sheet of PU coated onto said single layer of glass on the side of the ITO layer.

17. A window glass according to claim 16, wherein the single sheet of glass carries, at its periphery, a continuous layer of opaque enamel, reduced to a dotted line in the area adjacent the longitudinal center of the window glass, a conductive strip with a silver base being arranged at the edge of the enamel, partly on the dots of enamel and partly on the ITO layer.

18. A wind glass according to claim 17, characterized by the fact that the deposits of enamel arranged on the periphery of the sheets of glass are deposited on faces of said glass sheets directed to the interior of a space enclosed by the window glass.

19. A window glass according to one of claim 16, characterized by the fact that it presents a light transmission ($T_L$) greater than or equal to 70, a reduced energy transmission ($T_E$) resulting in a ratio of $T_L/T_E$ on the order of 1.5, and a uniform electrical resistance per square, either less than or equal to 5 ohms.

20. The window glass of claim 19, wherein the electrical resistance per square is about 4.5 ohms.

21. A window glass according to claim 16, having a uniform electrical resistance of about 10 ohm per square.

22. A window glass according to claim 11, wherein the sheet of glass having the ITO layer has two faces, faces 3 and 4 and carrying the ITO layer on its face 3, is clear glass, and a sheet of glass with faces 1 and 2, which is combined with sheet of glass carrying the ITO layer by the intermediary of the sheet of plastic material, is of "TSA" or "TSA$^{2+}$" glass.

23. A window glass according to claim 22, comprising an exterior sheet of tinted "TSA" glass with a maximum thickness on the order of 2.2 mm, a sheet arranged towards the interior of a space enclosed by the window glass, of clear glass with a thickness on the order of 2.1 to 2.6 mm, coated with an ITO layer with a thickness on the order of 350 to 380 nm on the face facing towards the sheet of tinted glass, these two sheets of glass being combined into a laminate with the intermediary layer of a sheet of flexible material with an index greater than 1.

24. The window glass of claim 22, wherein said plastic material comprises polyvinylbutyral.

25. A window glass according to claim 22, comprising an exterior curved sheet of tinted "TSA" glass with a maximum thickness on the order of 2.6 mm, a curved sheet arranged towards the interior of a space enclosed by the window glass, of clear glass with a thickness on the order of 2.1 to 2.6 mm, coated with an ITO layer with a thickness on the order of 180 nm on the face facing towards the sheet of tinted glass, these two curved sheets of glass being combined into a laminate with the intermediary layer of a sheet of flexible material with an index greater than 1.

26. The window glass of claim 25, wherein said flexible material is comprised of polyvinylbutyral.

27. A window glass according to claim 1, comprising means of supplying current to provide electricity for the ITO layer.

28. A window glass according to claim 27, wherein the means of supplying current are comprised of two serigraphed strips comprising Ag or an Ag alloy.

29. A window glass according to claim 27, wherein the means of supplying current are two metallic tinsels, comprising copper, which are brought into contact with the ITO layer, these tinsels being arranged between the said layer and the sheet of plastic material with an index greater than that of air, coated against the said layer.

30. A window glass according to claim 29, wherein two electrical connections to which the tinsels are attached are essentially at the same location, in an extension of one power lead strip formed by one of the tinsels, another power lead strip formed by the other tinsel, passing at the side of the sheet of flexible material with an index greater than that of air and not in contact with the ITO layer, through an incision made in this sheet and leading to a common position of exit, and being insulated from the ITO layer by the thickness of the sheet of flexible material.

31. A window glass according to claim 1, it is encapsulated in a plastic about its periphery.

32. The curved window glass of claim 1, wherein the conductive ITO layer has a uniform square resistivity equal to or less than 10 ohms.

33. A curved window glass prepared by coating a flat sheet of glass with an electroconductive layer of metal oxide comprised of indium tin oxide (ITO) obtained by pyrolysis, followed by a reduction treatment, of a powdered mixture of a tin compound and an indium compound, on face 3 of the faces of said curved window glass numbered conventionally 1, 2, 3 and 4 proceeding from the outside to the inside of the space enclosed by the window glass, followed by bending of the glass sheet thereby shaping the glass such that face 3 is convex, and then covering the ITO layer with a sheet of flexible polyvinylbutyral, and finally completing the curved windshield by placing a bent glass sheet over the polyvinylbutyral layer.

* * * * *